US011080448B1

(12) United States Patent
Schiller et al.

(10) Patent No.: US 11,080,448 B1
(45) Date of Patent: Aug. 3, 2021

(54) METHOD AND SYSTEM FOR FORMAL BUG HUNTING

(71) Applicant: Cadence Design Systems, Inc., San Jose, CA (US)

(72) Inventors: Yaron Schiller, Kiryat Ono (IL); Guy Wolfovitz, Hadera (IL); Habeeb Farah, Nazareth (IL)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/910,815

(22) Filed: Jun. 24, 2020

(51) Int. Cl.
*G06F 30/30* (2020.01)
*G06F 30/3323* (2020.01)
*G06F 111/08* (2020.01)
*G06F 7/58* (2006.01)

(52) U.S. Cl.
CPC .......... *G06F 30/3323* (2020.01); *G06F 7/588* (2013.01); *G06F 2111/08* (2020.01)

(58) Field of Classification Search
CPC ...... G06F 30/30; G06F 30/33; G06F 2111/02; G06F 8/20; G06F 2115/08; G06F 8/34; G06F 30/3323; G06F 9/4494; G06F 30/333; G06F 16/212; G06F 16/26; G06F 2111/04; G06F 2111/10; G06F 2111/12; G06F 2111/20; G06F 2119/18; G06F 3/048; G06F 30/13; G06F 8/41; G06F 9/44; G06F 2115/10; G06F 8/53; G06F 11/3604; G06F 13/161; G06F 13/18; G06F 11/261; G06F 2119/06; G06F 30/327; G06F 30/3308; G06F 30/34; G06F 11/362; G06F 16/9027; G06F 2117/08; G06F 2119/02; G06F 30/331; G06F 30/337; G06F 30/367; G06F 8/30; G06F 11/3466; G06F 2113/04; G06F 3/04847; G06F 30/12; G06F 30/398; G06F 30/396; G06F 31/317; G01R 31/318364; G01R 31/318314; G01R 31/318307; G01R 31/31704; G01R 31/318357; G01R 31/2848; G01R 31/317; G01R 31/318555; Y10T 29/4913; H01L 2924/19107; H01L 25/00
USPC .................................................. 716/100–108
See application file for complete search history.

(56) References Cited

U.S. PATENT DOCUMENTS

| 7,130,783 | B1 * | 10/2006 | Harer ...................... G06F 30/33 |
| | | | 703/13 |
| 10,380,301 | B1 * | 8/2019 | Goyal ..................... G06F 30/30 |
| 2013/0318486 | A1 * | 11/2013 | Sasaki ..................... G06F 30/30 |
| | | | 716/106 |

\* cited by examiner

*Primary Examiner* — Binh C Tat
(74) *Attorney, Agent, or Firm* — Pearl Cohen Zedek Latzer Baratz LLP (57) ABSTRACT

A method for formal deep bug hunting in a device under test (DUT) may include obtaining a selection of a start state for the DUT; obtaining a selection of one or a plurality of variables that are declared as random variables; for each of said one or a plurality of random variables, generating a sequence of random values in a generation order using a random number generator (RNG); and performing formal verification exploration of the DUT starting at the start state and consecutively assigning each of said one or a plurality of random variables a value from the sequence of values in the generation order.

14 Claims, 6 Drawing Sheets

Prior Art

METHOD AND SYSTEM FOR FORMAL BUG HUNTING

FIELD OF THE INVENTION

The present invention relates to formal verification. More specifically the present invention relates to method and system for formal bug hunting in an electronic circuit design.

BACKGROUND OF THE INVENTION

Design verification is a common process for testing a newly designed integrated circuit, board, or system-level architecture, to, for example, confirm that it complies with the requirements defined by the specification of the architecture for that device.

Verification of electronic designs typically has three forms. At an early stage, before the electronic design is implemented in hardware, simulation can be conducted on a model of the design. Another form can be emulation, in which one electronic hardware is used to mimic the behavior of another (tested) electronic hardware. At more advanced stages of design development, a system on a chip can be validated, in a process which is typically referred to as post-silicon verification. Post-silicon verification can be a last stage in the electronic design development, for example, after manufacturing.

Another form of verification is formal verification, which rather than testing a device under test (DUT), can be aimed at proving or disproving the correctness of a given logic with respect to a certain formal specification, using formal methods of mathematics.

In simulation, complex scenarios may be randomly generated by using random value generation, and biasing may be applied by using weighted distribution. Constraints may also be used to provide control over the randomization by restricting possible range or ranges of the generated random values that are produced for random variables. Distribution may also be used, which may allow some random values to be allocated more often than other random values for specific random variables (this is also referred to as weighted distribution).

Formal verification typically involves exhaustively checking verification properties of a DUT, by covering all possible scenarios and/or stimuli, while verifying that required constraints are met. Formal verification engines typically generate traces that may be hard to control and may require elaborated description to depict complex scenarios, due to the exhaustive nature of formal verification, that allows generating the shortest scenario for the required verification target. To generate such complex scenarios a verification expert may need to manually craft cover properties and direct the formal engines, which is unscalable when considering big designs.

Hybrid formal bug hunting techniques which can involve non-exhaustive and exhaustive aspects have been introduced, for example, using traces obtained by random heuristics to define starting states for exhaustive search, deploying simulation engines (typically assertion driven simulation—ADS). Formal bug hunting techniques may prove successful in uncovering new bugs when functional simulation regression becomes stagnant and fails to find as many bugs as before.

SUMMARY OF THE INVENTION

There is thus provided, according to some embodiments of the present invention, a computer implemented method for formal deep bug hunting in a DUT that includes obtaining a start state for the DUT. The method may also include using the processor obtaining a subset of one or a plurality of variables from a plurality variables of the DUT, and setting the subset of the one or a plurality of variables to one or a plurality of random variables. The method may also include, for each of said one or a plurality of random variables, generating a sequence of random values in a generation order using a random number generator (RNG); and performing formal verification exploration of the DUT starting at the start state and consecutively assigning each of said one or a plurality of random variables a value from the sequence of values in the generation order.

In some embodiments of the invention, the obtaining of the subset includes using a checker construct.

In some embodiments of the invention, generating the sequence includes using a dedicated seed for the RNG for each random variable of said one or a plurality of random variables.

In some embodiments of the invention, the consecutively assigning each of said one or a plurality of random variables the value from the sequence of values in the generation order includes assigning that value at a clocking event of an assumption set relating to that random variable.

In some embodiments of the invention, the RNG includes a first input for inputting initial seed, a second input for inputting clocking events, and an output for outputting a current state of the RNG.

In some embodiments of the invention, the method further includes obtaining one or a plurality of user-defined distribution decisions to control the probability of assigning a certain value of said sequence of values.

In some embodiments of the invention, for each of said one or a plurality of random variables, generating the sequence of random values includes initializing hierarchically the RNGs of all the random variables.

In some embodiments of the invention, the start state is selected using one or a plurality of traces.

In some embodiments of the invention, a system for formal bug hunting is provided that includes memory; and a processor configured to obtain a subset of one or a plurality of variables from a plurality of variables in the DUT, to set the subset of one or a plurality of variables to one or a plurality of random variables; for each of said one or a plurality of random variables, to generate a sequence of random values in a generation order using an RNG; and to perform formal verification exploration of the DUT starting at a selected start state and consecutively assigning each of said one or a plurality of random variables a value from the sequence of values in the generation order.

In some embodiments of the invention, a non-transitory computer readable storage medium for formal bug hunting, is provided, having stored thereon instructions that when executed by a processor will cause the processor to: set a subset of one or a plurality of variables of a device under test (DUT) to one or a plurality of random variables, for each of one or a plurality of random variables of a DUT, generate a sequence of random values in a generation order using a RNG; and perform formal verification exploration of the DUT starting at a selected start state and consecutively assigning each of said one or a plurality of random variables a value from the sequence of values in the generation order.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF EMBODIMENTS OF THE INVENTION

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating", or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Figure 1:
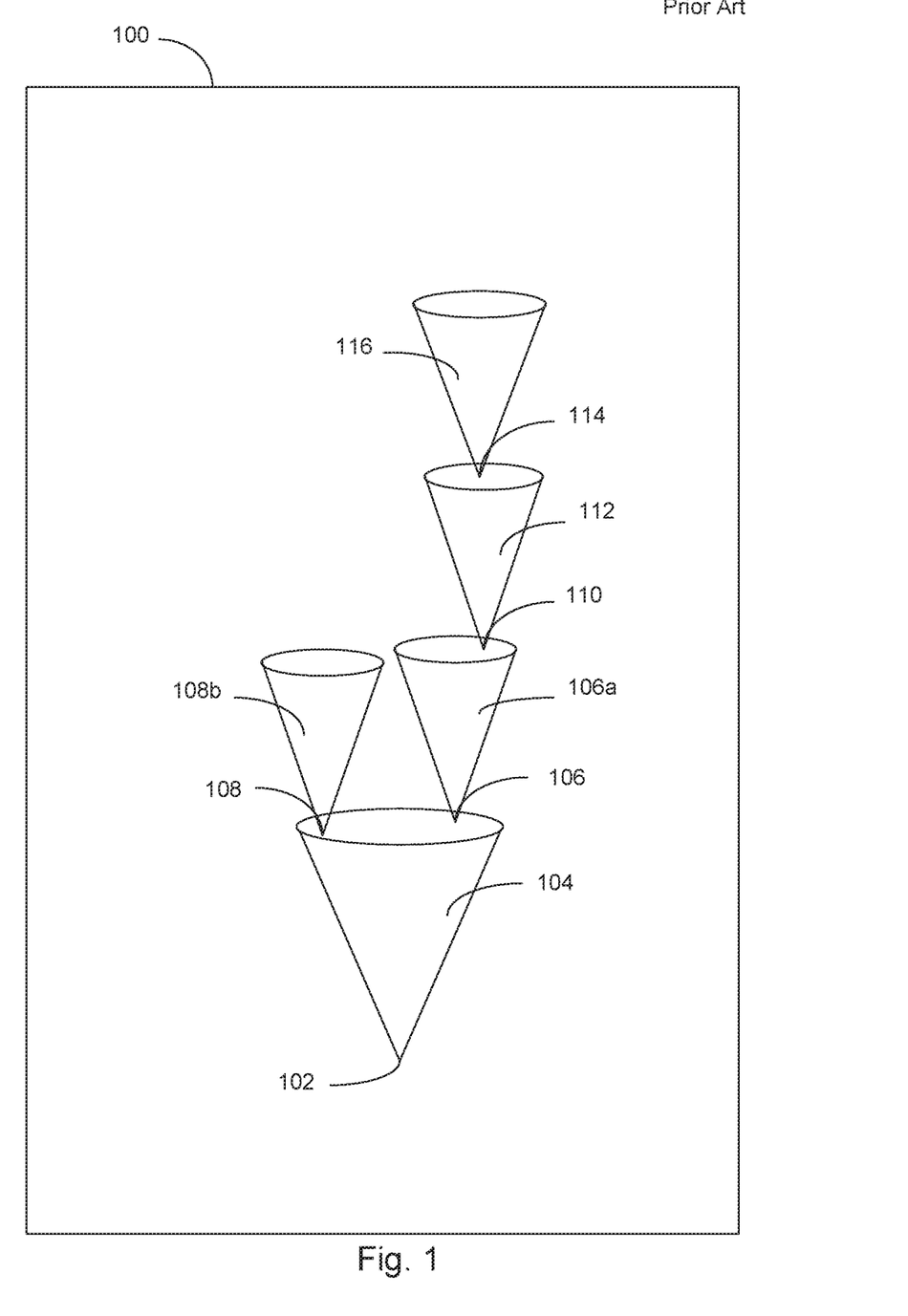
FIG. 1 is a schematic illustration of a formal bug hunting technique (prior art).

FIG. 1 is a schematic illustration of a formal bug hunting technique (prior art). The state space of a DUT 100, in particular in big designs, is typically enormous, and may render classic formal verification exhaustive approach inappropriate for formal bug hunting. For sake of brevity the term "DUT" used in the present specification, may refer to the DUT itself (e.g., a model representing the DUT), or nthe testing environment (e.g., the testbench), or both.

Focused approaches, e.g., waypoints, coverpoints and goal-posting (hereinafter generally referred to as "cover properties") have been proposed, in which a trace obtained using some random heuristics may be used as a start state for an exhaustive formal exploration within the DUT to find bugs in the DUT and/or explore states which classic formal verification exploration in unlikely to encounter. For example, start state 102 may be identified, found or selected (e.g., from a trace generated in an exhaustive formal verification process, or from ADS), as a start state, and formal verification technique may be applied in exploring the DUT from that start state, which substantially reduces the combinatoric burden that characterizes exhaustive formal verification process. For example, a cone of influence (COI) 104 emerging from start state 102 may be subjected to formal verification exploration and two additional points of interest 106 and 108, each of which may serve as a start state for further formal verification exploration of the respective COIs, 106a and 108a. Another point of interest 110 may be identified, found or selected, and used as a start state for even further formal verification exploration of the corresponding COI 112, and so on (e.g., start point 114 identified, found or selected, and the corresponding COI 116).

However, even when limiting the formal verification process to start from a certain start state, an exhaustive formal verification process tends to hit targeted cover properties via the shortest or shorter paths, which may result in neglecting to examine more complex paths in the design.

Simulation may typically be subjected to constraint randomization—a constraint solver may be used to bias the generated stimuli to better target cover properties of particular interest. For example, constraint randomization may be applied to obtain weighted distribution of random values for random variables. A simulation may thus be more efficiently directed to find points of interest in the DUT. It may be desirable to direct formal verification exploration in formal bug hunting by applying biasing weighted distribution on the formal technique.

Formal bug hunting typically starts by selecting a trace from a set of traces (e.g., obtained using ADS or exhaustive formal verification) in which a specific event of interest was recorded, for example, a specific packet that was output from a switch of the DUT. An event on a trace may embody many decisions, e.g., what are the packet characteristics, e.g., what is the packet length, what header does it contain, what is the target address of the packet, what is the source address of the packet, what is the gap of that packet from a previous packet, was the packet transmitted continuously or intermittently, was there an error in transmission or not, etc. Describing so many factors to identify a trace or traces to start the formal bug hunting with, that would yield effective results, may prove to be practically unscalable.

Figure 2:
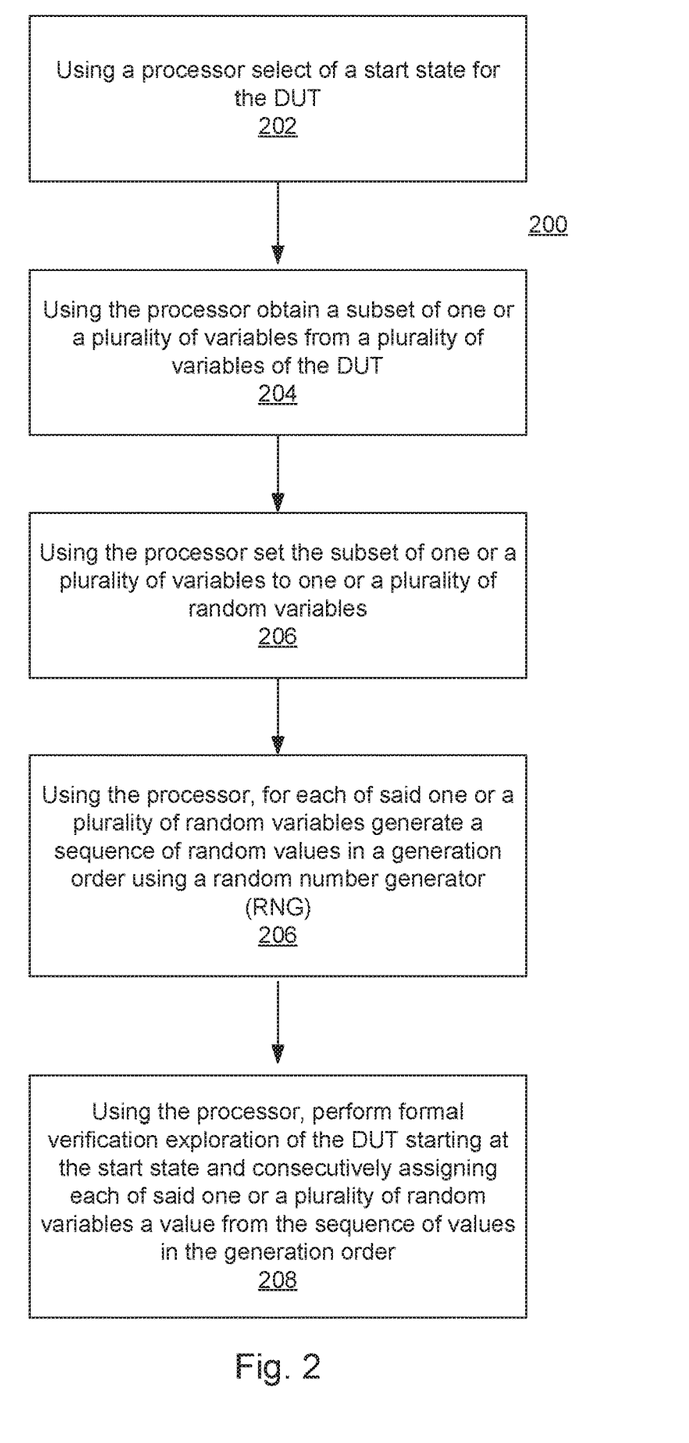
FIG. 2 is a diagram of a method for formal bug hunting, according to some embodiments of the present invention.

FIG. 2 is a diagram of a method 200 for formal bug hunting, according to some embodiments of the present invention.

Method 200 may include selecting 202 a start state for the DUT. Method 200 may also include obtaining 204 a selection of one or a plurality of variables that are declared as random variables. The selection of the one or a plurality of variables that are declared as random variables may be performed automatically (e.g., by a processor). In some embodiments, a user may provide a selection of one or a plurality of variables that are declared as random variables. Method 200 may also include, for each of said one or a plurality of random variables, generating 206 a sequence of random values in a generation order using an RNG. Method 200 may also include performing 208 formal verification exploration of the DUT starting at the start state and consecutively assigning each of said one or a plurality of random variables a value from the sequence of values in the generation order. When a set of random values is generated the generation order is the chronological order in which these values were generated, for example, for a set of values that were generated, e.g., 1, 7, 34, 5, the first value in the generation order is 1, the second value in the generation order is 7, the third value in the generation order is 34 and the fourth value in the generation order is 5.

In some embodiments of the invention, the obtaining of the selection includes using a checker construct.

In some embodiments of the invention, generating the sequence includes using a dedicated seed for the RNG for each random variable of said one or a plurality of random variables.

In some embodiments of the invention, consecutively assigning each of said one or a plurality of random variables the value from the sequence of values in the generation order includes assigning that value at a clocking event of an assumption set relating to that random variable.

In some embodiments of the invention, the RNG includes a first input for inputting initial seed, a second input for inputting clocking events, and an output for outputting a current state of the RNG.

In some embodiments of the invention, the method further includes obtaining one or a plurality of user-defined distribution decisions to control the probability of assigning a certain value of said sequence of values.

In some embodiments of the invention, for each of said one or a plurality of random variables, generating the sequence of random values includes initializing hierarchically the RNGs of all the random variables.

In some embodiments of the invention, the start state is selected using one or a plurality of traces.

For example, a formal verification engine of an electronic design automation (EDA) tool may obtain from a user a selection of one or a plurality of variables relating to the DUT to be declared as random variables, e.g., in a checker construct, when running in a bug hunting mode.

For example, in SystemVerilog a variable may be declared as a random variable using the "rand" keyword, such as in the following snippet, where "idx" is declared as a random variable.

checker reason_about_one_bit(bit [63:0] data1, bit [63:0] data2, event clock);
  rand const bit [5:0] idx;
  a1: assert property (@clock data1[idx]==data2[idx]);
endchecker:|reason_about_one_bit According to some embodiments of the present invention, after declaring one or a plurality of random variables of the DUT, the formal verification engine of the EDA may handle two types of variables: totally free variables that may be assigned any values, and "pseudo-free" variables, which are the declared random variables and may be assigned values by an RNG. In some embodiments of the present invention, for each declared random value the formal verification engine assigns a dedicated seed to initialize the RNG, so as to obtain a sequence of random values that is independent of other RNGs used for other random variables.

According to some embodiments of the present invention, when performing bug hunting, a random variable in a checker may be assigned a value at each clocking event of the assumption set pertaining to that random variable.

The assignment of random values to the random variables, according to some embodiments of the present invention, may ensure stability of the randomization process. Each random variable may be linked to a dedicated RNG seed, which is used for all randomization operations invoked for that variable. The order at which the RNGs are seeded may be kept, thus providing the same initialization information for each RNG initialization seed. RNG initialization may be hierarchical. The random numbers generated by a certain RNG are deterministic based on their initial seeding. An RNG state is persistent until the next randomization call. Assigning dedicated RNG per random variable may result in the randomization operation using one RNG in connection with a certain random variable without influencing or otherwise affecting the randomization operation performed on another random variable that was assigned another RNG.

Figure 3:
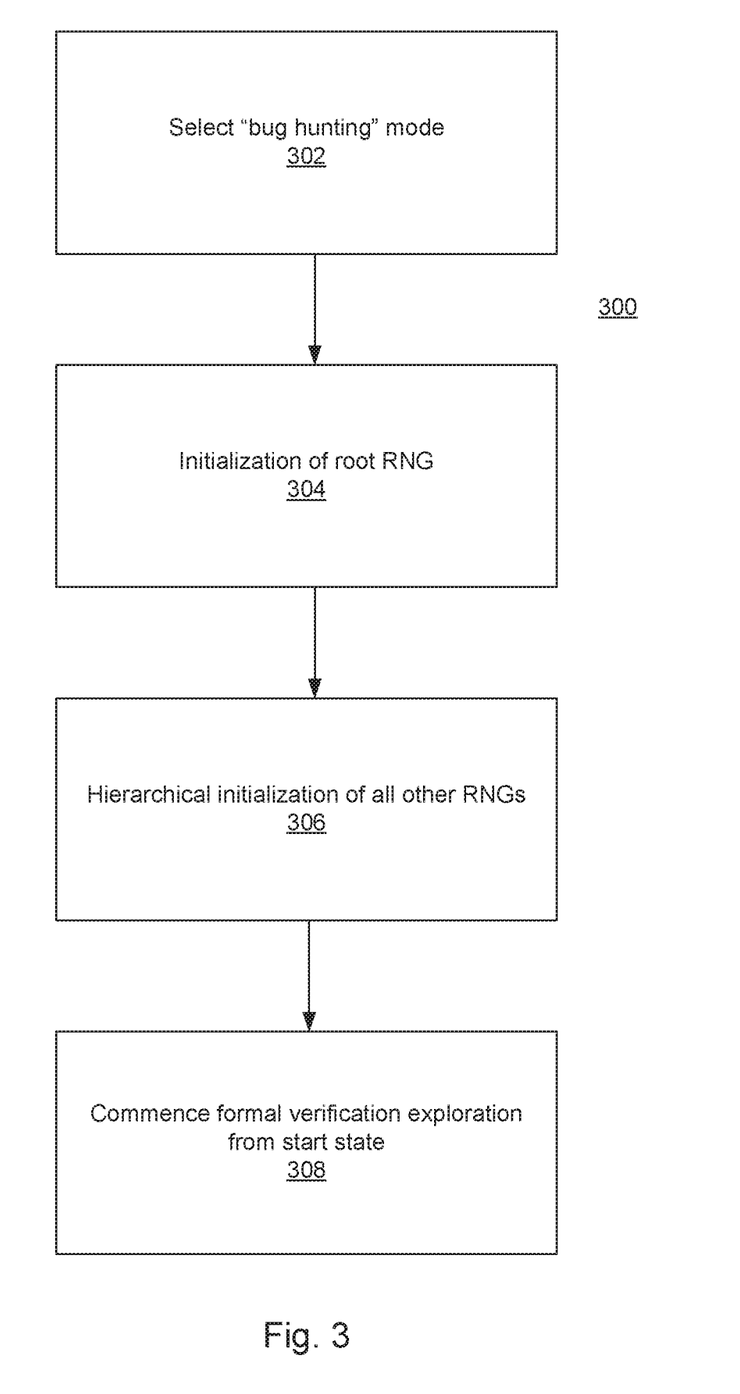
FIG. 3 shows a general process of seeding a RNG dedicated to a random variable, according to some embodiments of the present invention.

A general process 300 of seeding an RNG dedicated to a random variable is shown in FIG. 3, according to some embodiments of the present invention.

A formal engine of an EDA may be designed to obtain a user selection 302 of "bug hunting" mode. A root RNG may be initialized 304, followed by hierarchical initialization 306 of all other RNGs, and the formal verification exploration then commences 308, from a selected start state.

Figure 4:
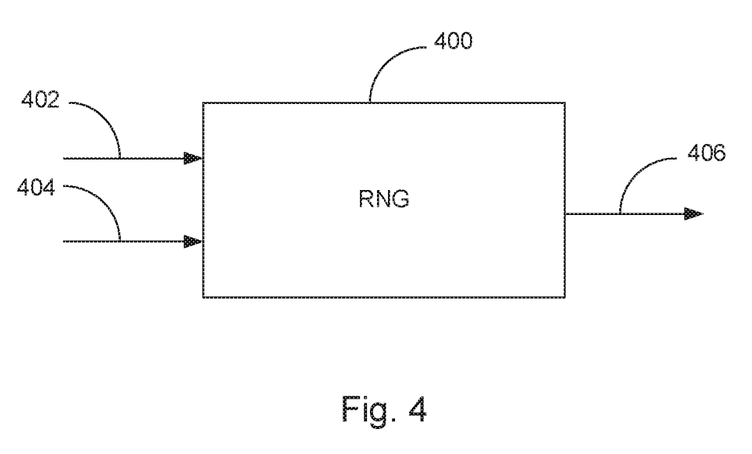
FIG. 4 illustrates an RNG according to some embodiments of the present invention.

FIG. 4 illustrates an RNG 400 according to some embodiments of the present invention. RNG 400 may have a first input 402 which receives an initializing seed provided by the initialization RNG.

Second input 404 is designed to receive clocking events, each of which causes the RNG to change a state.

The output 406 is designed to output the state (a current value of the RNG prior to the time of the clocking event).

In the following example the concept of distribution may be appreciated.

The use of SystemVerilog "dist" operator in assumptions related to the assumption set of the "rand" variable "free" is demonstrated.

checker distribution_example_checker(
  input clk, reset, [1:0] mux_sel
)
  rand bit [1:0] free;
  ASM1: assume property (@(posedge clk) iff mux_sel==2'b1) free dist {[0:1]: 1, 2:=2, 3:=7});
  ASM2: assume property (@(posedge clk) iff mux_sel==2'b2) free dist {[0:1]: 7, 2:=2, 3:=1});

Upon the occurrence of the event "posedge clk" with the value of mux_sel being in the range of (1.2), the RNG undergoes a state change. The free variable is assigned a value according to the current state of the RNG (the value prior to the latest clocking event).

When the value of mux_sel is 1, the value of "free" is assigned with the following values and probabilities: 10% a random value in the range of [0:1], 20% the value 2, and 70% the value 3.

When the value of mux_sel is 2, the value of "free" is assigned with the following values and probabilities: 10% a random value in the range of [0:1]. 20% the value 2, and 70% the value 3.

Figure 5:
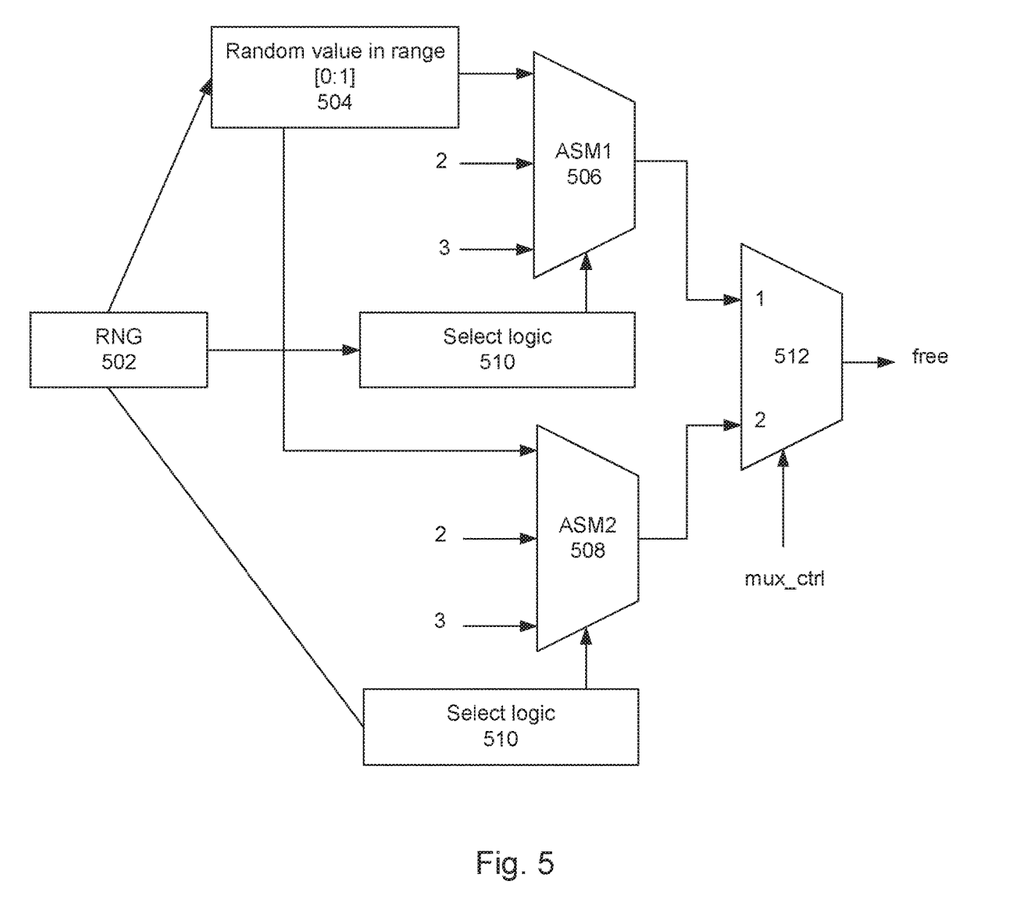
FIG. 5 is an RNG logic circuit according to some embodiments of the present invention.

FIG. 5 is an RNG logic circuit according to some embodiments of the present invention. The circuit in this example includes an RNG 502, random value range operator 504, select logic operator 510, assumption 1 and assumption 2 gates (506 and 508 respectively) and free variable value operator 512. It may be evident, when reviewing the RNG logic circuit, that the RNG is responsible for allocating the random number that triggers the free variable by controlling the random value in the range [0:1] and the weighted bin selection of the "dist" operation.

Randomization, according to some embodiments of the present invention, is typically applied in the formal engine, by introducing the RNG into the engine itself, and not via higher level heuristics (as opposed to techniques involving usage of traces and constraint random simulation). The formal bug hunting technique according to some embodiments of the invention promotes unification of bug hunting heuristics in the source code itself, and not in the form of an additional layer of software process.

When formal engines reach their limitations, bug hunting approach, for example, as described in the present specification and accompanying drawings, can be used to dig into deeper states of the register transfer level (RTL). Bug hunting heuristics can greatly benefit from randomization and distributions, as described herein. The controllability of the bug hunting process may be enhanced when decisions are weighted, allowing focusing on critical cover properties that may be required for signoff. Furthermore, local constraints applied using formal engines may facilitate exploring non-trivial sequence of events, which may otherwise be overlooked when performing exhaustive bug hunting (due to the nature of exhaustive bug hunting that tends to find shortest-path or shorter-path events). The weighted random mechanism according to some embodiments of the invention may facilitate discovery of non-trivial sequences of events.

Figure 6:
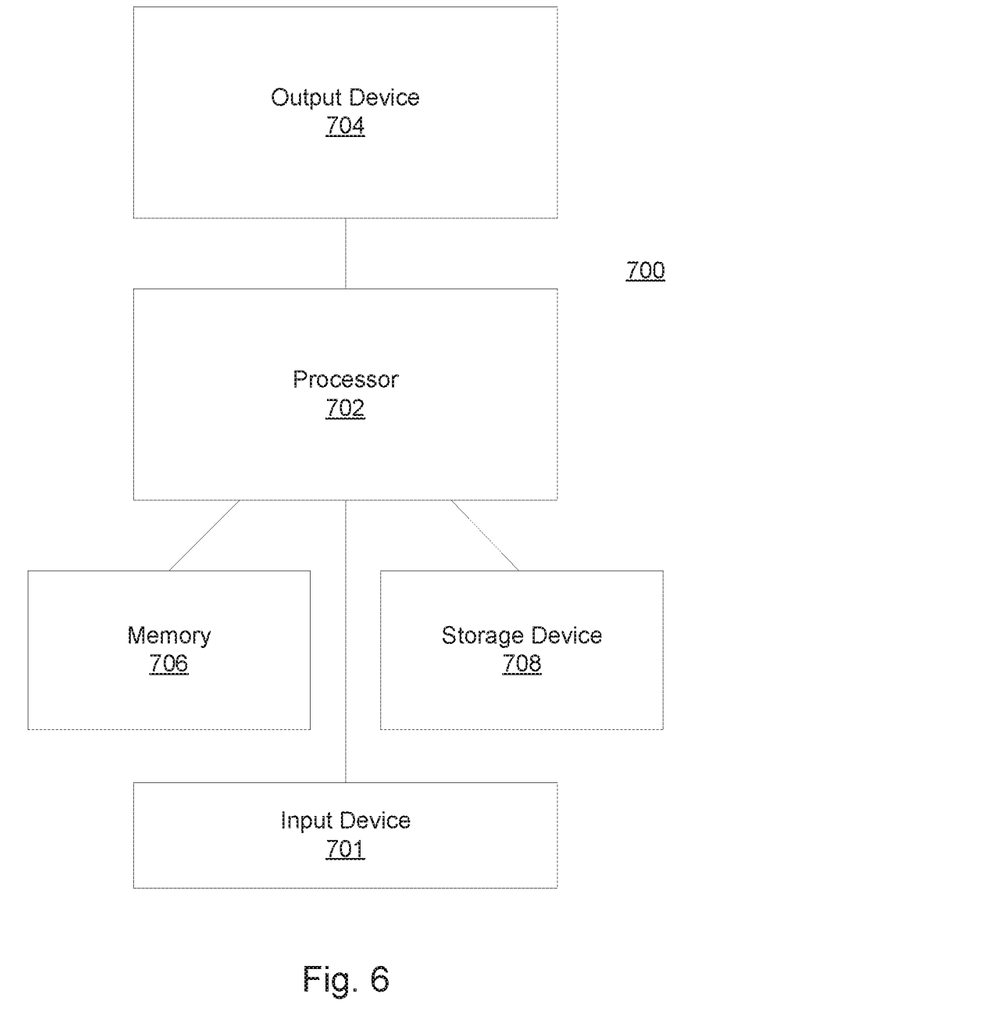
FIG. 6 shows a system for formal bug hunting, according to some embodiments of the present invention.

FIG. 6 shows a system for formal bug hunting, according to some embodiments of the present invention. System 700 may include a processor 702 (e.g. single processor or a processing unit made that includes a plurality of processors, on a single machine or distributed on a plurality of machines) for executing a method according to some embodiments of the present invention. Processing unit 702 may be configured to perform a method according to some embodiments of the present invention and perform other actions and processing according to some embodiments of the present invention.

Processor 702 may be linked with memory 706 on which a program implementing a method according to some embodiments of the present invention and corresponding data may be loaded and run from, and storage device 708, which includes a non-transitory computer readable medium (or mediums) such as, for example, one or a plurality of hard disks, flash memory devices, etc., on which a program implementing a method according to some embodiments of the present invention and corresponding data may be stored. System 700 may further include an output device 704 (e.g. display device such as CRT, LCD, LED, OLED, etc.) on which one or a plurality user interfaces associated with a program implementing a method according to some embodiments of the present invention and corresponding data may be presented. System 700 may also include input interface 701, such as, for example, one or a plurality of keyboards, pointing devices, touch sensitive surfaces (e.g. touch sensitive screens), etc., for allowing a user to input commands and data.

Some embodiments of the present invention may be embodied in the form of a system, a method or a computer program product. Similarly, some embodiments may be embodied as hardware, software, or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stored on the computer readable medium may be in the form of an installed application or in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A computer implemented method for formal deep bug hunting in a device under test (DUT) comprising:
   using a processor, obtaining a start state for the DUT;
   using the processor, obtaining a subset of one or a plurality of variables from a plurality of variables of the DUT;
   setting the subset of the one or a plurality of variables to one or a plurality of random variables;
   for each of said one or a plurality of random variables, generating a sequence of random values in a generation order using a random number generator (RNG) using a dedicated seed for the RNG for each random variable of said one or a plurality of random variables;
   performing formal verification exploration of the DUT starting at the start state and consecutively assigning each of said one or a plurality of random variables a value from the sequence of values in the generation order, wherein the consecutively assigning comprises assigning that value at a clocking event of an assumption set relating to that random variable; and
   finding one or more bugs if present in the DUT.

2. The method of claim 1, wherein the obtaining of the subset comprises using a checker construct.

3. The method of claim 1, wherein the RNG comprises a first input for inputting initial seed, a second input for inputting clocking events, and an output for outputting a current state of the RNG.

4. The method of claim 1, further comprising obtaining one or a plurality of user-defined distribution decisions to control the probability of assigning a certain value of said sequence of values.

5. The method of claim 1, wherein for each of said one or a plurality of random variables, generating the sequence of random values comprises initializing hierarchically the RNGs of all the random variables.

6. The method of claim 1, wherein the start state is selected using one or a plurality of traces.

7. A system for formal bug hunting, the system comprising:
   memory; and
   a processor configured to:
      obtain a subset of one or a plurality of variables from a plurality of variables of the DUT;

set the subset of one or a plurality of variables to one or a plurality of random variables;

for each of said one or a plurality of random variables, generate a sequence of random values in a generation order using a random number generator (RNG) using a dedicated seed for the RNG for each random variable of said one or a plurality of random variables;

perform formal verification exploration of the device under test (DUT) starting at a start state and consecutively assigning each of said one or a plurality of random variables a value from the sequence of values in the generation order, wherein the consecutively assigning comprises assigning that value at a clocking event of an assumption set relating to that random variable; and find one or more bugs if present in the DUT.

8. The system of claim 7, wherein the processor is configured to obtain of the subset using a checker construct.

9. The system of claim 7, wherein the RNG comprises a first input for inputting initial seed, a second input for inputting clocking events, and an output for outputting a current state of the RNG.

10. The system of claim 7, wherein the processor is configured to further obtain one or a plurality of user-defined distribution decisions to control the probability of assigning a certain value of said sequence of values.

11. The system of claim 7, wherein for each of said one or a plurality of random variables, the processor is configured, when generating the sequence of random values to initialize hierarchically the RNGs of all the random variables.

12. The system of claim 7, wherein the processor is configured to obtain a selection of the start state.

13. A non-transitory computer readable storage medium for formal bug hunting, having stored thereon instructions that when executed by a processor will cause the processor to:

set a subset of one or a plurality of variables of a device under test (DUT) to one or a plurality of random variables;

for each of one or a plurality of random variables of the DUT, generate a sequence of random values in a generation order using a random number generator (RNG) using a dedicated seed for the RNG for each random variable of said one or a plurality of random variables;

perform formal verification exploration of the DUT starting at a selected start state and consecutively assigning each of said one or a plurality of random variables a value from the sequence of values in the generation order, wherein the consecutively assigning comprises assigning that value at a clocking event of an assumption set relating to that random variable; and find one or more bugs if present in the DUT.

14. The non-transitory computer readable storage medium of claim 13, having stored thereon instructions that when executed by a processor will cause the processor to further obtain one or a plurality of user-defined distribution decisions to control the probability of assigning a certain value of said sequence of values.

* * * * *